US011451155B2

(12) United States Patent
Ng et al.

(10) Patent No.: US 11,451,155 B2
(45) Date of Patent: Sep. 20, 2022

(54) POWER GENERATION AND ZVS CONTROL IN A POWER SUPPLY

(71) Applicant: Infineon Technologies Austria AG, Villach (AT)

(72) Inventors: Wee Tar Richard Ng, Singapore (SG); Zan Wang, Singapore (SG); Xiang Yuan, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 32 days.

(21) Appl. No.: 16/945,989

(22) Filed: Aug. 3, 2020

(65) Prior Publication Data
US 2022/0037985 A1 Feb. 3, 2022

(51) Int. Cl.
*H02M 3/335* (2006.01)
*H02M 1/00* (2006.01)

(52) U.S. Cl.
CPC ... *H02M 3/33569* (2013.01); *H02M 3/33523* (2013.01); *H02M 1/0058* (2021.05)

(58) Field of Classification Search
CPC ............. H02M 3/335; H02M 3/33569; H02M 1/0058; H02M 3/01; H02M 3/33523
See application file for complete search history.

(56) References Cited

U.S. PATENT DOCUMENTS

| | | | |
|---|---|---|---|
| 10,804,805 B1* | 10/2020 | Radic ...................... H02M 7/48 |
| 2014/0029316 A1* | 1/2014 | Adragna ............... H02M 3/335 363/21.18 |
| 2015/0236598 A1* | 8/2015 | Krueger ............ H02M 3/33507 363/21.17 |
| 2016/0261201 A1* | 9/2016 | Tao ................... H02M 3/33523 |
| 2018/0076721 A1 | 3/2018 | Cannenterre et al. |
| 2018/0351464 A1 | 12/2018 | Finkel et al. |

OTHER PUBLICATIONS

Extended European Search Report, EP 21 18 7839, dated Dec. 3, 2021, pp. 1-7.

* cited by examiner

*Primary Examiner* — Gary L Laxton
(74) *Attorney, Agent, or Firm* — Armis IP Law, LLC (57) ABSTRACT

An apparatus comprises a controller operative to: i) monitor a resonant voltage associated with a primary winding magnetically coupled to a secondary winding; ii) control a flow of current through the primary winding to produce an output voltage at the secondary winding; and iii) control magnetization of the primary winding with respect to a detected a zero crossing event associated with the monitored resonant voltage. The controller further controls a duration of activating a switch coupled to an auxiliary winding (which is magnetically coupled to the primary winding) based on a magnitude of the monitored resonant voltage and/or a magnitude of an input voltage supplied to the primary winding. The controller operates in different modes of magnetizing the primary winding such as at peaks or valleys of the monitored resonant voltage depending on a magnitude of the input voltage.

26 Claims, 10 Drawing Sheets

POWER GENERATION AND ZVS CONTROL IN A POWER SUPPLY

BACKGROUND

Conventional switched mode power supplies are widely used for converting an input voltage into an output voltage to power a load.

One type of power supply is a flyback converter. A flyback converter is a specific type of switched mode voltage converter, which includes a transformer having a primary winding and a secondary winding. Typically, an electronic switch is connected in series with the primary winding to control a flow of corresponding current through the primary winding. The energy from flow of current through the primary winding causes a voltage to be produced from the secondary winding.

In general, during operation, windings of the transformer are magnetized when the electronic switch is closed and demagnetized when the electronic switch is opened. Magnetizing the transformer includes storing energy in the winding, and demagnetizing the transformer includes transferring the stored energy in the primary winding to a secondary winding and corresponding load.

A flyback converter can be operated in a so-called discontinuous conduction mode (DCM). In such an instance, there is a time delay time between the time when the transformer has been completely demagnetized and a time when a respective electronic switch coupled to the primary winding is activated again to store energy in the primary winding. During this delay time, because the winding is not completely demagnetized, parasitic oscillations of a voltage across the electronic switch may occur.

BRIEF DESCRIPTION

Embodiments herein include novel ways of reducing losses associated with ZVS (Zero Voltage Switching) pulse generation.

More specifically, embodiments herein include an apparatus comprising a controller operative to: i) monitor a resonant voltage associated with a primary winding magnetically coupled to a secondary winding; ii) control a flow of current through the primary winding to produce an output voltage at the secondary winding; and iii) control magnetization of the primary winding in response to detecting a zero crossing event associated with the monitored resonant voltage. In one embodiment, controlling magnetization includes pre-magnetizing the primary winding or demagnetizing the primary winding.

In one embodiment, the resonant voltage of the primary winding occurs due to at least a parasitic capacitance and inductance associated with the primary winding and a first switch, the first switch is operative to control the flow of current through the primary winding.

In one mode of operation, the controller is configured to select any of multiple zero crossing events as a basis to trigger magnetization of the primary winding. For example, in one embodiment, the controller is operative to select which of multiple zero crossing events (or conditions) of the monitored resonant voltage to use as a trigger to control activation of a switch controlling current through the primary winding depending on an amount of output current supplied by the output voltage to the load.

In still further example embodiments, the controller controls magnetization of the primary winding at a subsequent peak voltage of the monitored resonant voltage following the detected zero crossing event. In one embodiment, the subsequent peak voltage is a next peak voltage of the monitored resonant voltage following the detected zero crossing event.

Further embodiments herein include, via the controller, discontinuing execution of a first operational mode of magnetizing the primary winding in response to detecting that an input voltage to the primary winding is lower than a threshold value.

In still further embodiments, the controller activates a switch after a determined delay time with respect to detecting the zero crossing event. Activation of the switch control magnetization of the primary winding. In one embodiment, the predetermined delay time (with respect to the detected zero crossing event) is substantially 75% of a period (such as between 70 and 80%) of the monitored resonant frequency. In such an instance, magnetization is approximately coincidental with a peak voltage of the monitored resonant voltage.

In yet further embodiments, the controller controls a duration of activating a switch to magnetize the primary winding based on any suitable one or more parameters. For example, in one embodiment, the controller controls a duration of activating the one or more switches as described herein based on a magnitude of the monitored resonant voltage.

In accordance with another example embodiment, the controller controls a duration of activating the one or more switches as described herein based on multiple parameters such as a magnitude of the monitored resonant voltage and a magnitude of an input voltage supplied to the primary winding.

Still further embodiments herein include operating in different modes depending on a magnitude of the input voltage. For example, when a magnitude of the input voltage is above a respective threshold value, the controller operates in the first mode; when a magnitude of the input voltage is below a respective threshold value, the controller operates in the second mode.

Further embodiments herein include a power supply comprising: a switch controlled by the controller; a state of the switch controls the flow of current through the primary winding. The power supply further comprises a transformer including the primary winding and the secondary winding.

As previously discussed, embodiments herein are useful over conventional techniques. For example, switching as described herein reduces respective power losses associated with ZVS (zero voltage switching) pulse generation.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: monitor a resonant voltage associated with a primary winding magnetically coupled to a secondary winding; control a flow of current through the primary winding to produce an output voltage at the secondary winding; and control magnetization (such as pre-magnetize, demagnetize, etc.) of the primary winding in response to detecting a zero crossing event associated with the monitored resonant voltage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments as well) and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
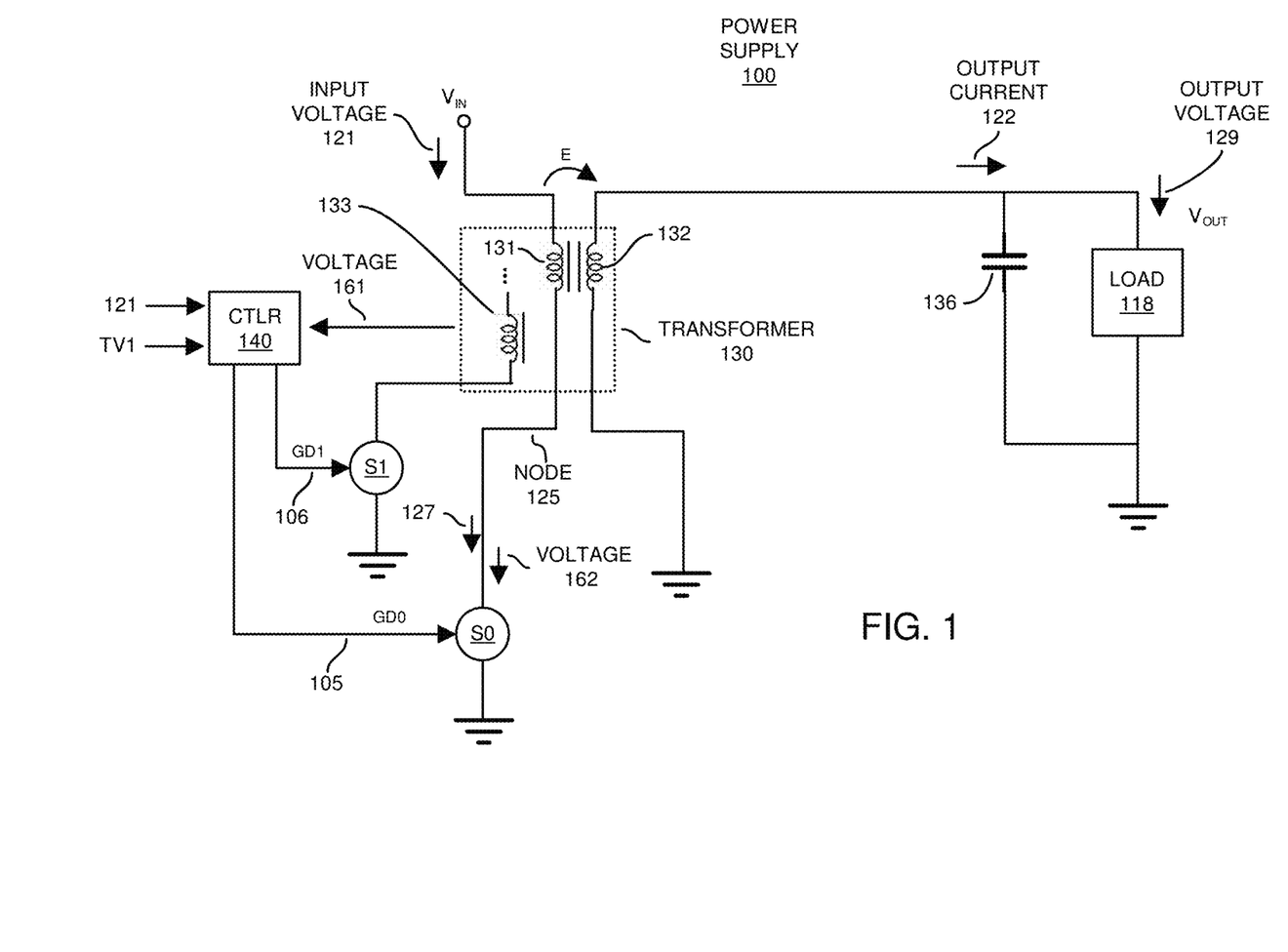
FIG. 1 is an example general diagram of a power supply supporting switch control and voltage generation according to embodiments herein.

Now, more specifically, FIG. 1 is an example general diagram illustrating a power supply according to embodiments herein.

As shown in this general example embodiment, power supply 100 (such as an apparatus, electronic device, hardware, circuitry, etc.) includes controller 140, transformer 130, switch S0, switch S1, output capacitor 136, and load 118.

Transformer 130 includes primary winding 131, secondary winding 132, and auxiliary winding 133. Transformer 130 may include any number of additional windings as further discussed herein.

In this example embodiment, the primary winding 131 is magnetically coupled to the secondary winding 132 and one or more other windings in the transformer 130. The transformer 130 also includes an auxiliary winding 133. The auxiliary winding 133 is also magnetically coupled to the primary winding 131 and the secondary winding 132.

As further shown, the primary winding 131 and the switch S0 are coupled in series between the input voltage source, Vin, and a ground reference. Yet further, the input voltage source Vin supplies input voltage 121 to the primary winding 131 of transformer 130.

The auxiliary winding 133 and switch S1 are coupled in series. In one embodiment, activation of switch S0 causes magnetic energy to be stored in the primary winding 131 or removed from the primary winding 131. As further discussed herein, activation of the switch S1 at an appropriate time during a control cycle magnetizes (such as pre-magnetizes) the primary winding 131, reducing a magnitude of the voltage at node 125 of the primary winding 131.

Further in this example embodiment, the input voltage source Vin supplies input voltage 121 (such as a substantially DC voltage value) to the primary winding 131 of transformer 130.

During operation, flow of current through the primary winding 131 via activation of switch S0 causes the storage of and/or conveyance of corresponding magnetic energy, E, in the primary winding 131 to the secondary winding 132 and generation of the output voltage 129 and corresponding output current 128 to the load 118.

Subsequent to activating the primary winding 131 for a first portion of a respective control cycle, the controller 140 monitors the voltage 161 or derivative thereof (such as a voltage associated with the auxiliary winding 133 of transformer 130). In one embodiment, the monitored voltage 161 tracks or is a replica of voltage 162 at node 125.

For at least a portion of a respective control cycle, after activating the switch S0, a magnitude of the voltage 161 resonates in accordance with a resonant frequency. As further discussed herein, if a magnitude of the input voltage 121 is less than the threshold value TV1, the controller 140 operates in a first operational mode as discussed in FIGS. 3 and 4. If the magnitude of the input voltage 121 is greater than the threshold value TV1, the controller 140 operates in a second operational mode as discussed in FIGS. 5 and 6.

Referring again to FIG. 1, while operating in the first mode, the controller monitors the voltage 161 to identify one or more corresponding zero crossing conditions. Depending on a monitored one or more parameters such as a magnitude of the output current 129, the amount of power or current consumed by the load 118, etc., the controller 140 controls a timing of activating the switch S0 via generation of control signal 105 (GD0).

In one embodiment, while operating in the second mode, the controller 140: i) monitors a resonant voltage 161 (replica of voltage 162) associated with the primary winding 131 magnetically coupled to the secondary winding 132; ii) controls a flow of current 127 through the primary winding 131 to produce the output voltage 129 at the secondary winding 132; and iii) controls magnetization of the primary winding 131 with respect to one or more detected zero crossing events associated with the monitored resonant voltage 161.

As shown, in one embodiment, the controller 140 receives the voltage 161 from the auxiliary winding 133, although the voltage 161 can be received from any suitable entity.

In one embodiment, resonance associated with the voltage 161 of the primary winding 131 occurs due to parasitic capacitance and inductance associated with the primary winding 131 and a first switch S0. This is discussed in more detail below.

Figure 2:
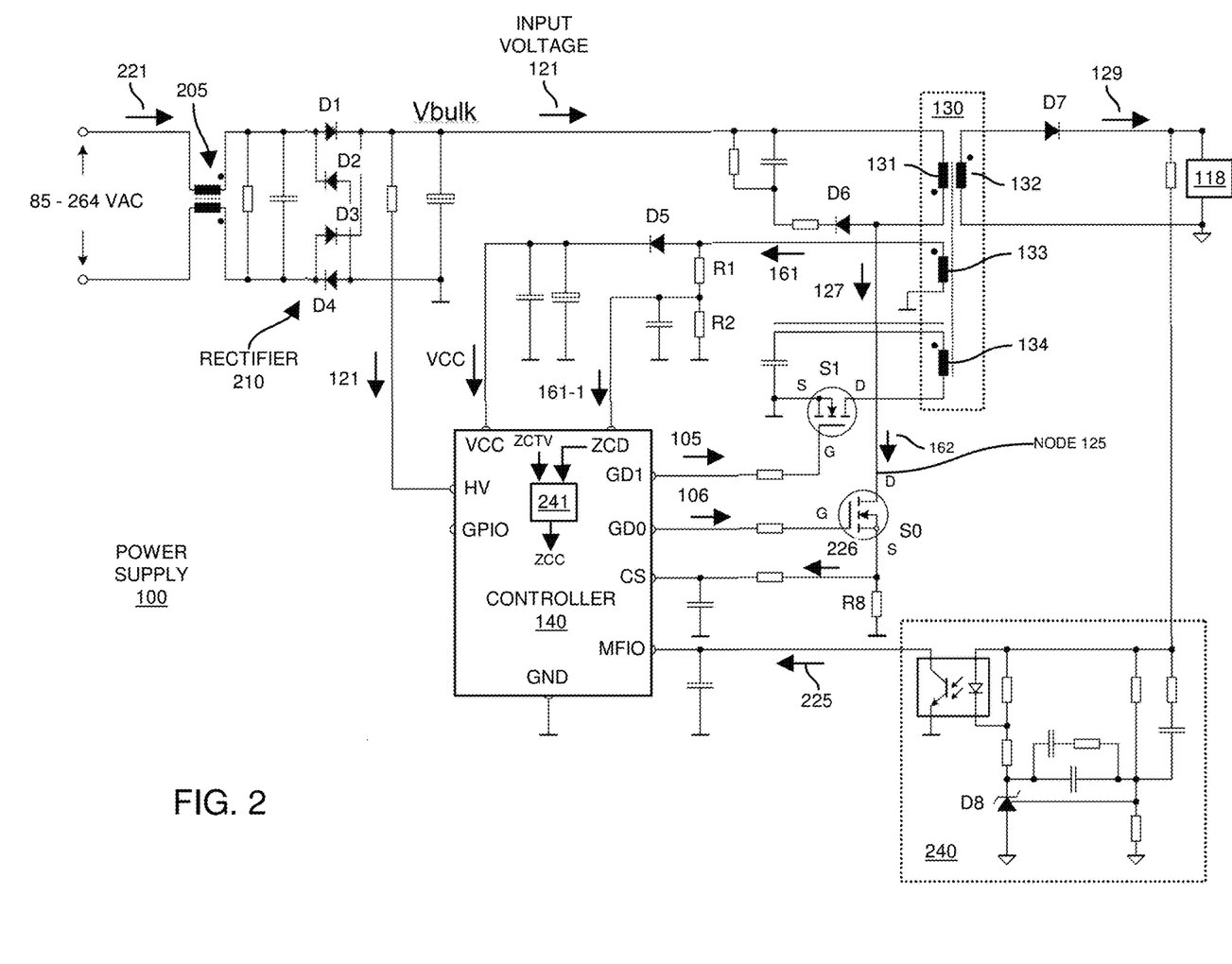
FIG. 2 is a detailed diagram illustrating a power supply and switch control according to embodiments herein.

FIG. 2 is a detailed diagram illustrating a power supply and switch control according to embodiments herein.

In this example embodiment, the power supply 100 includes filter 205, rectifier 210 (such as diodes D1, D2, D3, and D4), diode D6, diode D7, zener diode D8, transformer 130, controller 140, switch S0, and switch S1.

As its name suggests, filter 205 filters the received AC input voltage 221. Rectifier 210 rectifies the filtered input voltage 221 to produce the input voltage 121 (a.k.a., Vbulk such as DC voltage value).

As further shown, primary winding 131 of transformer 130 receives the input voltage 121 outputted from the rectifier 210. Switch S0 controls the flow of respective current 127 through the primary winding 131.

The repeated switched flow of current 127 through the primary winding 131 causes conveyance of respective magnetic energy from the primary winding 131 to the secondary winding 132. As previously discussed, via the energy received from the primary winding 131, the secondary winding 132 produces the output voltage 129 that powers the respective load 118.

As previously discussed, the transformer 130 further includes auxiliary winding 133 and auxiliary winding 134.

Auxiliary winding 133 produces a respective supply voltage that is supplied to the VCC pin of controller 140. For example, the voltage from winding 133 powers the controller 140 through diode D5.

The controller 140 includes a respective ZCD pin and corresponding circuitry to monitor one or more zero crossing conditions associated with the voltage 162 at node 125 via a replica resonant voltage 161 from the auxiliary winding 133.

The series resistors R1 and R2 produce resonant voltage 161-1 inputted to the controller 140. The magnitude of the resonant voltage 161-1 depends proportionally on settings of resistors R1 and R2.

In one embodiment, the controller 140 includes a comparator 241 that compares the voltage 161-1 to a respective zero crossing threshold value (ZCTV) to determine zero crossing conditions associated with the voltage 162.

Thus, in one embodiment, the voltage 161 and 161-1 are replicas (ratiometrically) tracking the voltage 162. Accordingly, monitoring the voltage 161 is akin to monitoring the voltage 162.

As further discussed herein, the controller 140 monitors the voltage 161 (via derivative voltage 161-1) to control states of the switch S0 and the switch S1.

In this example embodiment, as further shown, the controller 140 includes multiple input/output pins. Each of the different pins of the controller 140 supports a different function.

For example, as its name suggests, the ZCD pin of the controller 140 is coupled to a zero crossing detector (comparator 241) in the controller 140. The ZCD pin is connected to resistor R1 and R2 and basically the auxiliary winding 133 for zero crossing detection and positive pin voltage measurements associated with the voltage 161-1, which as previously discussed is a replica of the voltage 162 of the node 125 of primary winding 131.

The MFIO pin of the controller 140 is a Multi-Functional Input Output priority information. In one embodiment, the MFIO pin is connected to an optocoupler in monitor 240 that provides an amplified error signal for the PWM mode operation of generating the respective output voltage 129. Note that the monitor 240 provides any suitable feedback 225 such as an error signal of the output voltage 129 with respect to a setpoint voltage value, an amount of current consumed by the load 118, etc.

The GPIO pin of controller 140 is an I/O Digital General Purpose Input Output pin. The GPIO pin provides an UART interface until brown-in. It is switched to a weak pull down mode and disabled UART function during normal operation.

The CS pin of the controller 140 is a current sense pin. The CS pin is connected via a resistor in series to an external shunt resistor and the source of the switch S0 (such as power MOSFET).

The HV pin of the controller 140 is a High Voltage Input pin. The HV pin is connected to receive the rectified bulk voltage (a.k.a., the input voltage 121 such as DC input voltage).

The GD1 pin of controller 140 is a Signal Gate Driver Output. The GD1 pin provides a gate driver pulse signal (control signal 105) to initiate the forced frequency resonant mode operation.

The GD0 pin of controller 140 is a Gate Driver Output. The GD0 pin provides control signal 106 that directly drives the switch S0 (such as a power MOSFET).

The VCC pin of controller 140 is a Positive Voltage Supply to receive power generated by auxiliary winding 134.

The GND pin of controller 140 is a Power and Signal Ground.

As further shown, the secondary side of the power supply 100 includes monitor 240. As its name suggests, the monitor 240 monitors one or more parameters such as the magnitude of the output voltage 129, magnitude of output current 128, error voltage, etc., associated with the secondary side of power supply 100. The controller 140 receives feedback 225 from the monitor 240.

The controller 140 also receives feedback from the primary side of power supply 100 such as via feedback 226 from resistor R8. In one embodiment, the feedback 226 is a voltage across a respective resistor R8, indicating an amount of current 127 flowing through the primary winding 131 when the switch S0 is ON.

As further discussed herein, the controller 140 operates in different modes depending on a magnitude of the input voltage 121 (Vbulk). For example, when the input voltage 121 is below a respective threshold value TV1, the controller 140 operates in a first mode (See FIGS. 3 and 4) in which the switch S0 is activated in a control cycle but switch S1 is not activated at all during the control cycle. The first mode supports frequency modulation and switching at valleys of the monitored resonant voltage.

When the input voltage 121 is above a respective threshold value TV1, the controller 140 operates in a second mode (see FIGS. 5 and 6) in which both the switch S1 and switch S0 are activated at different times during a respective control cycle. The second mode supports switching at peaks of the monitored resonant voltage.

Figure 3:
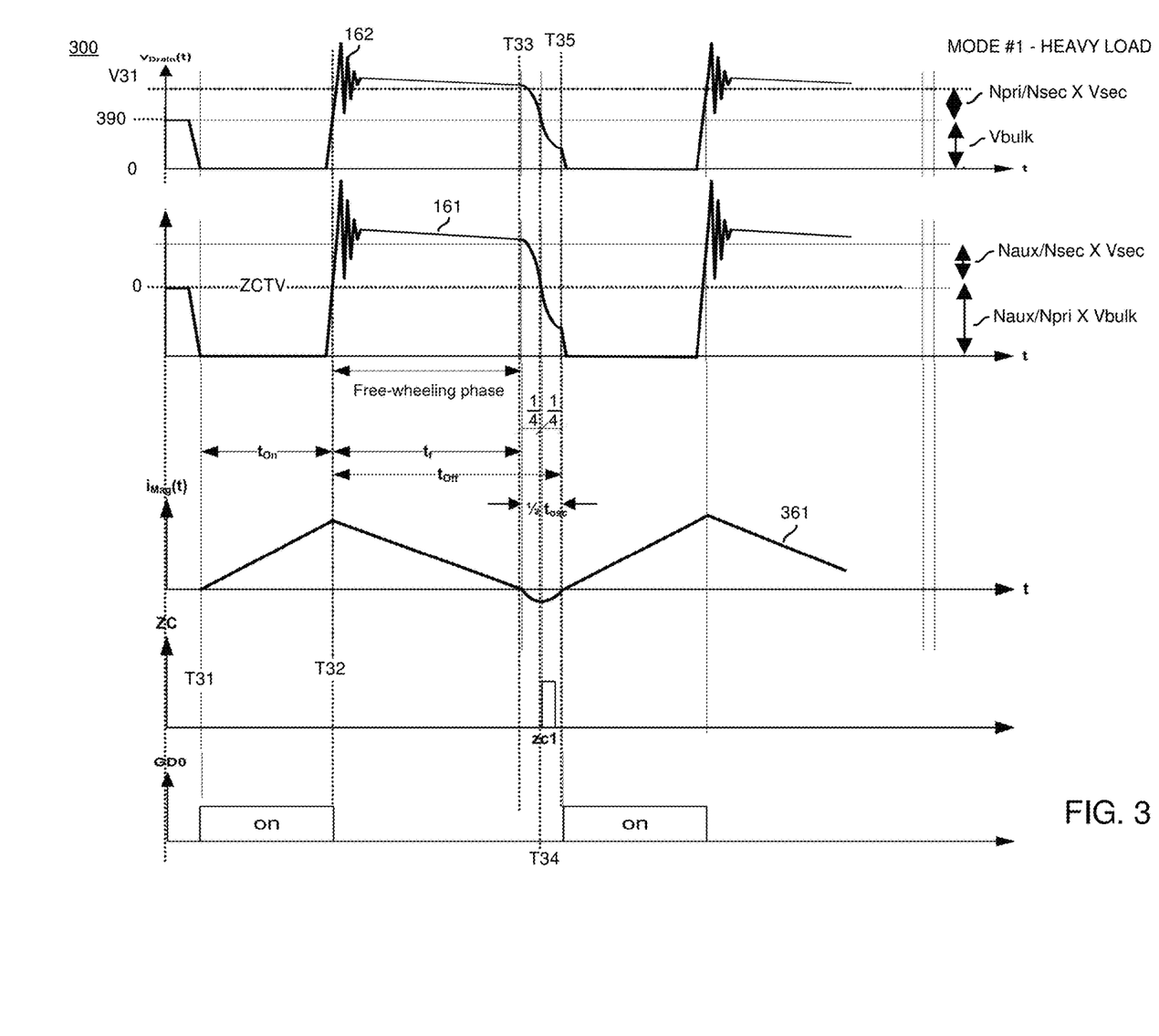
FIG. 3 is an example diagram illustrating operation of a power supply in a first mode according to embodiments herein.

FIG. 3 is an example diagram illustrating operation of a power supply in a first mode according to embodiments herein.

In this example embodiment, graph 300 illustrates operation of controller 140 and corresponding power supply 100 in a first mode. In one embodiment, the zero threshold value 390 is a magnitude of the input voltage 121 (or Vbulk). Threshold value V31 is equal to the input voltage 121 plus (Np/Ns)×output voltage 129 (a.k.a., Vsec), where Np is the number of windings on the primary winding 131, Ns is the number of windings of the secondary winding 132. Signal 361 represents the magnetizing current associated with transformer 130.

Note that the controller 140 can be configured to select any of multiple zero crossing events as a basis to trigger magnetization of the primary winding 131.

For example, in one embodiment, while operating in the first mode when the input voltage 121 is below the threshold value TV1, the controller 140 selects which of multiple zero crossing events associated with the monitored resonant voltage 162 to use as a trigger to activation of switch S0 and current through the primary winding 131.

In one embodiment, the selected zero crossing condition of the multiple zero crossing conditions associated with voltage 162 depends on a magnitude of the load 118 such as determined based on an amount of output current 127 supplied by the output voltage 129 to the load 118.

In this example embodiment, between time T31 and time T32, the controller 140 activates the switch S0 to an ON state causing current 127 to flow through the primary winding 131. Between time T32 and time T33, the power supply 100 operates in a free-wheeling mode.

As previously discussed, the controller 140 determines a magnitude of the load (such as based on consumed power). Assume in this example embodiment that the controller 140 detects that the load 118 is greater than a threshold value or is a full load. In such an instance, the controller 140 initiates activation of the switch S0 (sooner in time) at a first valley voltage at time T35 subsequent to the zero crossing condition detected at time T34. Time T35 occurs ¼ of the resonance period associated with the resonant frequency of monitored voltage 161 after time T34.

The resonance period of the voltage 161 and 162 can be determined in any suitable manner.

In one embodiment, the resonant period is defined by $T=2*\pi\sqrt{(Lp*Clumped)}$, where Lp is the magnetizing inductance associated with the winding 131, the value Clumped (capacitor-lumped) includes both the capacitance of Coss of the switch S0 (MOSFET) and parasitic capacitance of the transformer 130.

In this example embodiment, the controller 140 activates the switch S0 at the first valley voltage at time T35, which is a predetermined time delay of ¼ of the resonance period following the time T34.

Thus, at low line input voltage 121, and high current or power consumption by the load 118, the controller 140 turns on only GD0 to control switch S0. Control signal GD1 and switch S1 are not activated in the first mode.

As previously discussed, the zero crossing condition (event) is detected via monitoring the voltage 161 from the auxiliary winding 134, since as previously discussed, the voltage 161 and 161-1 of the auxiliary winding 134 is a replica of Vds and corresponding voltage 162 at node 125, but potentially with different turns ratio, proportionally due to resistors R1 and R2, etc.

Thus, after the zero crossing condition is detected, the controller 140 turns ON the switch S0 after a ¼ resonant period for each for multiple cycles in the first mode.

In one embodiment, the input Vmfio(Vfb) represents feedback 225 such as load information. It is used to identify the specific one of multiple zero crossing conditions in a sequence of multiple zero crossing conditions that will be used to activate the switch S0. Selection of which zero crossing condition to use controls the switching frequency of controlling the switch S0 while the power supply is operated in a so-called discontinuous conduction mode. In other words, depending on the load 118 and corresponding power consumption, the controller 140 varies (modulates) a frequency of activating switch S0.

As further discussed below, for a light load 118 condition, the controller 140 selects a later zero crossing condition in a sequence o multiple zero crossing conditions as a trigger in which to activate the switch S0.

Figure 4:
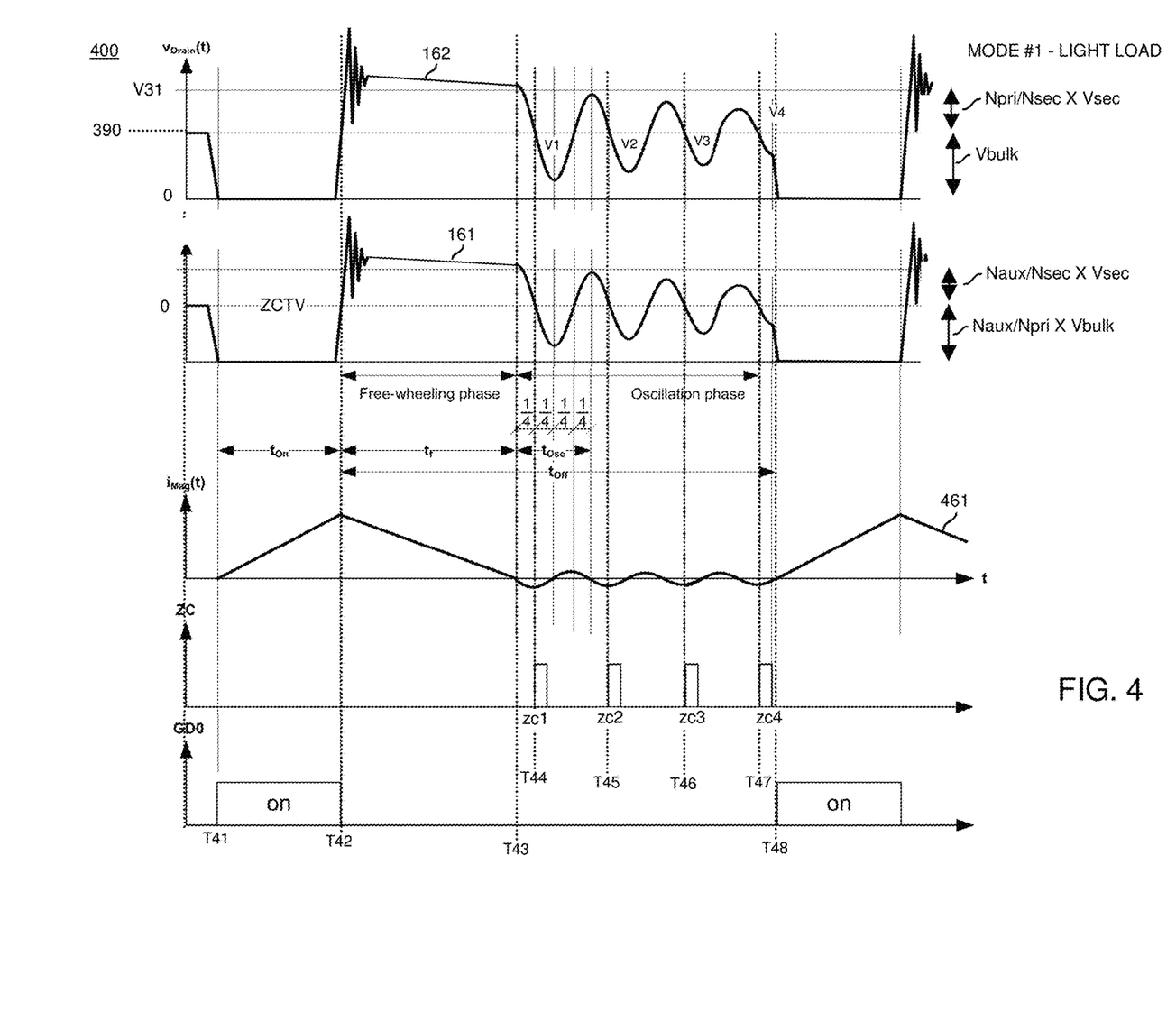
FIG. 4 is an example diagram illustrating operation of a power supply in a first mode according to embodiments herein.

FIG. 4 is an example diagram illustrating operation of a power supply in a first mode according to embodiments herein.

In this example embodiment, graph 400 illustrates operation in a first mode. The zero threshold value 390 is a magnitude of the input voltage 121 (or Vbulk). Threshold value V31 is equal to the input voltage 121 plus (Npri/Nsec)×output voltage 129 (a.k.a., Vsec), where Npri is the number of windings on the primary winding 131, Nsec is the number of windings of the secondary winding 132. Signal 461 represents the magnetizing current associated with transformer 130.

As previously discussed, the controller 140 can be configured to select any of multiple zero crossing events as a basis to trigger magnetization of the primary winding 131.

In this example embodiment, between time T41 and time T42, the controller 140 activates the switch S0 to an ON state causing current 127 to flow through the primary winding 131.

Between time T42 and time T43, the power supply 100 operates in a free-wheeling mode.

The first zero crossing condition is detected at time T44; the second zero crossing condition is detected at time T45; the third zero crossing condition is detected at time T46; the fourth zero crossing condition is detected at time T47.

As previously discussed, the controller 140 determines a magnitude of the load 118 (such as based on consumed power) or other suitable parameter and uses such information to determine which zero crossing condition to use as a basis of controlling a frequency of operation.

More specifically, assume in this example embodiment that the controller 140 detects that the load 118 is less than a threshold value or is a light load (such as less than or around 25% of maximum load). In such an instance, the controller 140 initiates activation of the switch S0 at a fourth valley voltage (time T48) a quarter (¼) resonance period subsequent to the zero crossing condition detected at time T47. Time T48 occurs 3 and ¼ resonance periods from T44 or ¼ a resonance period from the zero crossing condition detected at time T47.

As previously discussed, the resonance period of the voltage 161 and 162 can be determined in any suitable manner. In one embodiment, the resonant period is defined by $T=2*\pi\sqrt{(Lp*Clumped)}$, where Lp is the magnetizing inductance associated with the winding 131, the value Clumped (capacitor-lumped) includes both the capacitance of Coss of the switch S0 (MOSFET) and parasitic capacitance of the transformer 130.

In this example embodiment, the controller 140 activates the switch S0 at the fourth valley voltage at time T48, which is ¼ of a resonance period after time T47. Thus, at low line input voltage 121, the controller 140 allows only GD0 to be tuned ON. In other words, the controller 140 does not activate GD1 in a respective control cycle in the first mode of operation.

In one embodiment, the zero crossing condition (event) is detected via monitoring the voltage 161 and/or 161-1 from the auxiliary winding 134, since as previously discussed, the auxiliary winding 134 is a replica of Vds (voltage 162), but with different turns ratio.

As previously discussed, in one embodiment, the resonant period is defined by $T=2*\pi\sqrt{(Lp*Clumped)}$, where Lp is the magnetizing inductance of the winding 131, the value Clumped is a summation of both capacitance Coss of the switch S0 (such as a MOSFET device) and parasitic capacitor of the transformer 130.

Further embodiments herein include, via the controller 140, discontinuing execution of the first operational mode and operating in the second mode in response to detecting that a magnitude of the input voltage 129 to the primary winding 131 is higher than a threshold value TV1. In the second operational mode, the controller activates both GD0 and GD1 in a respective control cycle.

Figure 5:
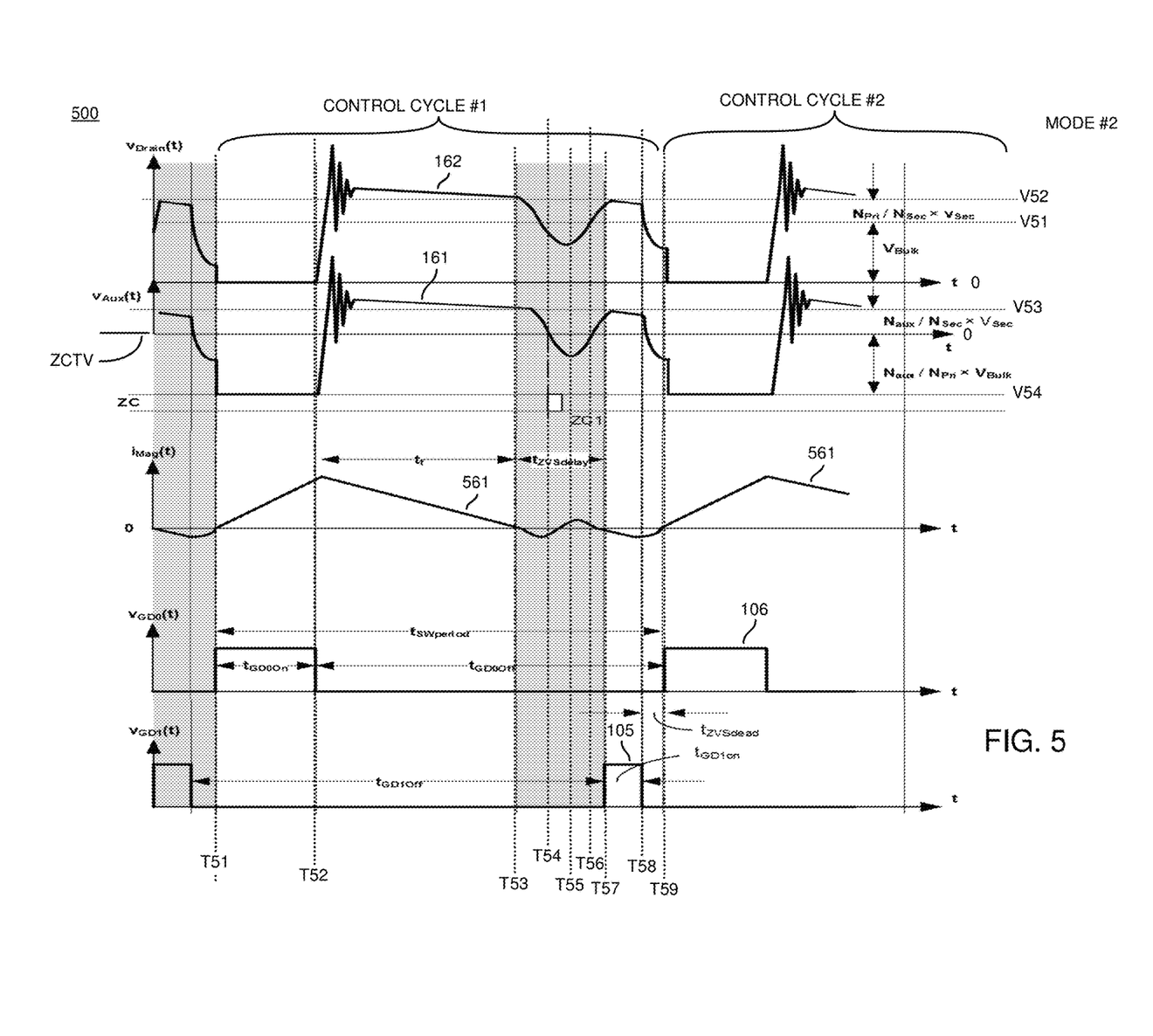
FIG. 5 is an example diagram illustrating operation of a power supply in a second mode according to embodiments herein.

Thus, when a magnitude of the input voltage 121 is below a respective threshold value such as TV1, the controller 140 operates in the first mode as shown in the FIGS. 4 and 5; when a magnitude of the input voltage 121 is above a respective threshold value TV1, the controller 140 operates in the second mode below in FIGS. 5 and 6;

FIG. 5 is an example diagram illustrating operation of a power supply in a second mode according to embodiments herein.

In this embodiment, assume that the controller 140 detects that the magnitude of the input voltage 121 is above a threshold value TV1 (such as above 180 VDC or other suitable value). In such an instance, the controller 140 operates in the second operational mode in which the controller 140 generates control signal 106 (GD1) and control signal 105 (GD0) at different times during a respective control cycle. Signal 561 represents the magnetizing current associated with transformer 130.

Between time T51 and time T52, the controller 140 activates switch S0 to an ON state, causing current 127 to flow through the primary winding 131 in a manner as previously discussed. The energy from winding 131 is conveyed to the secondary winding 132 that produces the respective output voltage 129.

In this example embodiment, the zero crossing event is triggered via monitoring the voltage 161 (or 161-1) from the auxiliary winding 134. As previously discussed, the voltage 161 (161-1) is generally a proportional replica of the voltage 162 at node 125 (such as drain node of switch S0). The ratio of the voltage 162 to voltage 161 (161-1) depends on the number of turns associated with the winding 131 and the winding 134.

When the zero crossing condition of voltage 161-1 (161) is detected via pin ZCD of controller 140 at time T54, the controller 140 turns on GD1 signal (control signal 105) after ¾ resonant period of the voltage 161 (161-1) or a peak voltage at time T57. The resonant period of the voltage 161 between time T53 and time T57 is defined by $T=2*\pi\sqrt{(Lp*Clumped)}$, where Lp is the magnetizing inductance associated with the winding 134, the value Clumped (capacitor-lumped) includes both the capacitance of Coss of the switch S0 (MOSFET) and parasitic capacitance of the transformer 130.

After GD1 (control signal 105) turns ON for a determined amount of time (such as between T57 and time T58, the controller 140 sets GD1 (control signal 105) to a logic low again at time T58, shutting OFF switch S1. Thus, the controller 140 activates the switch S1 ON between time T57 and T58 to pre-magnetize the primary winding 131.

After a dead time between T58 and T59 (during which the voltage of the node 125 decreases by an amount such as 30-40 volts), the controller 140 activates the control signal 106 (GD0) at time T59, starting a new control cycle.

In one embodiment, as previously discussed, the controller 140 receives load information (such as a magnitude of the load 118). The controller 140 uses the load information to determine which zero crossing event in a sequence of multiple zero crossing events associated with voltage 161-1 (and thus voltage 162) is to be used to control activation of the switch S0 to an ON state. In other words, the load information (such as amount of output current 128, percentage of full load, etc.) influences the switching frequency of operating the power supply 100 since earlier turn on of the switch S0 increases a frequency of operation while delaying the turn ON of switch S0 reduces the switching frequency.

As previously discussed, in a light load 118 when the load 118 consumes less than threshold value of power or current, the controller delays turn ON of the switch S0 to a later zero crossing condition; in a heavier load condition such as when the load 118 consumes more than a threshold value of power or current, the controller 140 turns ON the switch S0 earlier in a respective control cycle as in FIG. 5.

Note that further embodiments herein include adapting a width of the ON time associated with the control signal 105 depending on the line voltage (input voltage 121) and the output voltage 129.

For example, in one embodiment the ON time width (ZVS width) of the control signal 105 in the second mode is as follows:

$$\text{ZVS width} = k\_bulk * \text{BULK\_VOLTAGE} + k\_vout * \text{ZCD\_voltage} + c\_offset$$

Where k_bulk (a.k.a., input voltage 121) and k_vout are configurable parameters that vary depending on a respective system design. C_offset is a fixed parameter to compensate any linear effects.

Introduction of such scheme will allow ZVS pulse width to adapt according to AC Line (input voltage 121) and different output voltages.

As a further example, in one embodiment, the controller 140 determines the ZVS width as follows:

$$\text{ZVS width} = k\_bulk/65536 * \text{BULK\_VOLTAGE} + k\_vout/65536 * \text{ZCD\_voltage} + c\_offset$$

1. The controller 140 detects the Bulk cap voltage (i.e., BULK_VOLTAGE or input voltage 121) via the HV pin or indirectly from the ZCD winding 134, since ZCD pin will be clamped to almost zero, so the controller 140 (such as an integrate circuit) will sense current flowing out ZCD pin to determine the Bulk capacitor voltage.

2. While the positive signal of ZCD includes output voltage information, the controller 140 senses the output voltage 129 from the ZCD pin such as via (Vaux/[Vsec*Vsec]).

Figure 6:
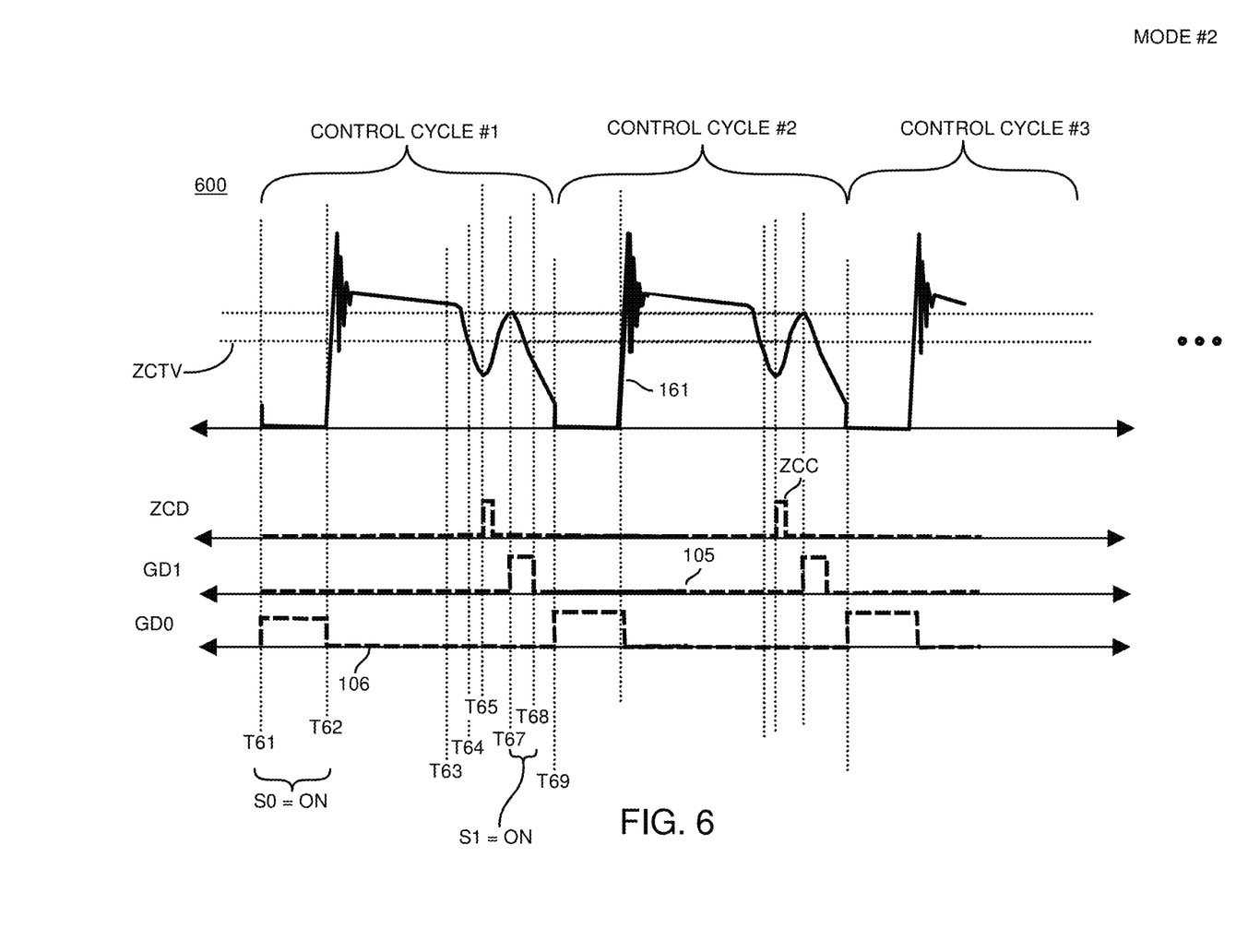
FIG. 6 is an example diagram illustrating operation of a power supply in a second mode according to embodiments herein.

FIG. 6 is an example diagram illustrating operation of a power supply in a second mode according to embodiments herein.

In this example embodiment, the controller 140 detects that the input voltage 121 is above a respective threshold value TV1 and operates in mode #2. In a manner as previously discussed, the controller 140 i) monitors voltage 161 (161-1), which is associated with primary winding 131 because the voltage 161 (161-1) is a replica of voltage 162; ii) controls a flow of current 127 through the primary winding 131 to produce an output voltage 129 at the secondary winding 132; and iii) controls magnetization of the primary winding 131 in response to detecting a zero crossing event associated with the monitored resonant voltage at time T64.

As previously discussed, the voltage 161 and voltage 162 resonate due to parasitic capacitance and inductance associated with the primary winding 131 and the first switch S0 that controls the flow of current 127 through the primary winding 131.

Between time T61 and T62, the controller 140 activates the switch S0 to an ON state. The time between T62 and T63 represents a free-wheeling phase of operation.

At or around time T63, the controller 140 monitors the voltage 161 to detect a respective zero crossing condition, which is detected at time T64.

In one embodiment, the controller 140 initiates magnetization of the primary winding 131 at a first subsequent peak voltage (time T67) of the monitored resonant voltage 161 following the detected zero crossing even at time T64. For example, the subsequent peak voltage occurs at time T67, which is a next peak voltage of the monitored voltage 161 following the detected zero crossing event a time T64.

In this example embodiment, the controller 140 activates the switch S1 after a delay time with respect to detecting the zero crossing event at time T64. Activation of the switch S1 between time T67 and T68 pre-magnetizes the primary winding 131. In one embodiment, the predetermined delay time (with respect to the detected zero crossing event at time T64) is substantially 75% of a period (such as between 70 and 80%) of the monitored resonant frequency of the voltage between time T63 and time T68. In such an instance, magnetization is coincidental with a approximately peak voltage at time T67.

As previously discussed, the controller 140 controls a duration of activating the switch S1 to magnetize the primary winding based on any suitable one or more parameters. For example, in one embodiment, the controller 140 controls a duration of activating the switch S0 based on a magnitude of the monitored resonant voltage 161.

In accordance with another example embodiment, the controller 140 controls a duration of activating the switch S0 based on multiple parameters such as a magnitude of the monitored resonant voltage 161 and a magnitude of an input voltage 121 supplied to the primary winding 131.

Note again that the controller 140 chooses a respective peak voltage following one or more zero crossing conditions depending on the load 118. For example, if the load 118 is less than a threshold value or is a light load (such as less than or around 25% of maximum load), the controller 140 initiates activation of the switch S0 at a later zero crossing condition such as a fourth valley voltage a quarter (¼) resonance period subsequent to the $4^{th}$ zero detected crossing condition.

As previously discussed, embodiments herein are useful over conventional techniques. For example, zero voltage switching as described herein reduces respective power losses associated with ZVS pulse generation.

Figure 7:
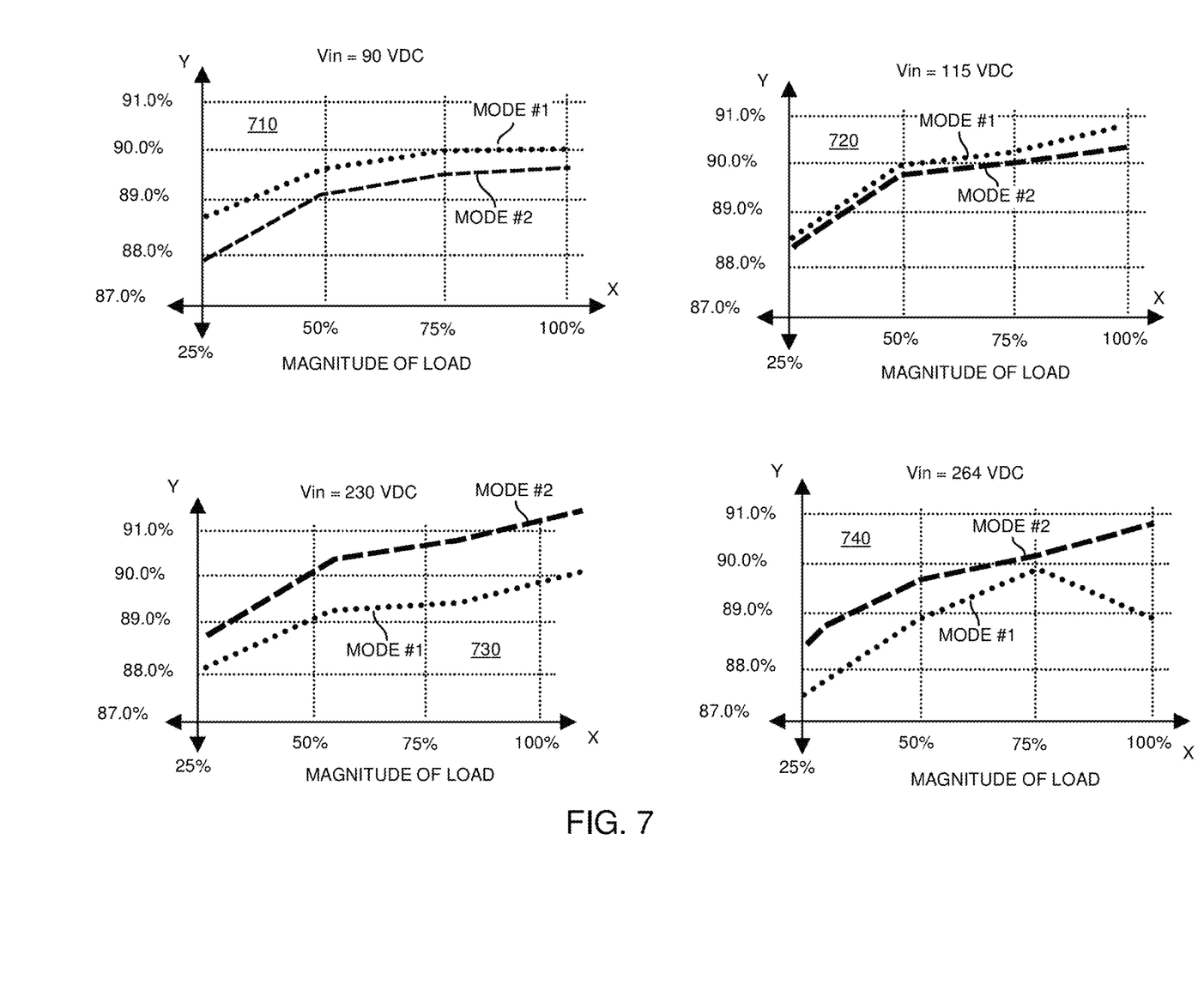
FIG. 7 are example theoretical graphs illustrating graphs increased efficiency of implementing the different modal operations of a respective power supply according to embodiments herein.

FIG. 7 are example graphs illustrating theoretical increased efficiency of implementing the different modal operations of a respective power supply according to embodiments herein.

Graph 710 illustrates efficiency of operating the power supply 100 in mode #1 versus mode #2 at an input voltage of 90 volts DC. The X-axis indicates a magnitude of the load 118 and percentage of power consumption; the Y-axis indicates a respective efficiency of the power supply 100 converting the input voltage 121 into the output voltage 129. In such an instance, as shown in graph 710, operation of the power supply 100 is more efficient in mode #1 in which control signal 106 or GD0 and corresponding switch S0 are disabled in a respective control cycle as illustrated in FIGS. 3 and 4.

Graph 720 illustrates efficiency of operating the power supply 100 in mode #1 versus mode #2 at an input voltage of 115 volts DC. The X-axis indicates a magnitude of the load 118 and percentage of power consumption; the Y-axis indicates a respective efficiency of the power supply 100 converting the input voltage 121 into the output voltage 129. In such an instance, as shown in graph 720, operation of the power supply 100 is more efficient in mode #1 in which control signal 106 or GD0 and corresponding switch S0 are disabled in a respective control cycle as illustrated in FIGS. 3 and 4.

Graph 730 illustrates efficiency of operating the power supply 100 in mode #1 versus mode #2 at an input voltage of 230 volts DC. The X-axis indicates a magnitude of the load 118 and percentage of power consumption; the Y-axis indicates a respective efficiency of the power supply 100 converting the input voltage 121 into the output voltage 129. In such an instance, as shown in graph 730, operation of the power supply 100 is more efficient in mode #1 in which control signal 106 or GD0 and corresponding switch S0 are enabled in a respective control cycle as illustrated in FIGS. 5 and 6.

Graph 740 illustrates efficiency of operating the power supply 100 in mode #1 versus mode #2 at an input voltage of 264 volts DC. The X-axis indicates a magnitude of the load 118 and percentage of power consumption; the Y-axis indicates a respective efficiency of the power supply 100 converting the input voltage 121 into the output voltage 129. In such an instance, as shown in graph 740, operation of the power supply 100 is more efficient in mode #1 in which control signal 106 or GD0 and corresponding switch S0 are enabled in a respective control cycle as illustrated in FIGS. 5 and 6.

Thus, embodiments herein are useful over conventional techniques. For example, as illustrated in the graphs of FIG. 7, operation of the power supply 100 in the different modes supports more efficient conversion of the input voltage 121 into the output voltage 129.

Figure 8:
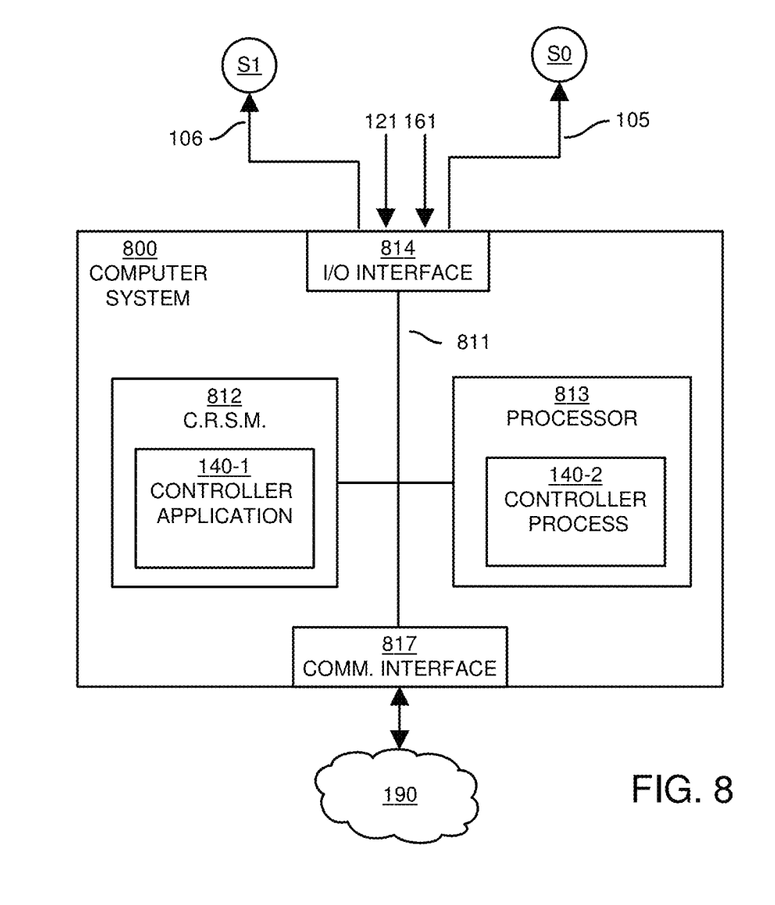
FIG. 8 is an example diagram illustrating computer processor hardware and related software instructions that execute methods according to embodiments herein.

FIG. 8 is an example block diagram of a computer system for implementing any of the operations as previously discussed according to embodiments herein.

Any of the resources (such as controller 140, etc.) as discussed herein can be configured to include computer processor hardware and/or corresponding executable instructions to carry out the different operations as discussed herein.

For example, as shown, computer system 850 of the present example includes an interconnect 811 that couples computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to switches S0 and S1.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with controller application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in controller application 140-1 stored on computer readable storage medium 812. Execution of the controller application 140-1 produces controller process 140-2 to carry out any of the operations and/or processes as discussed herein.

Those skilled in the art will understand that the computer system 850 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 9. Note that the steps in the flowchart below can be executed in any suitable order.

Figure 9:
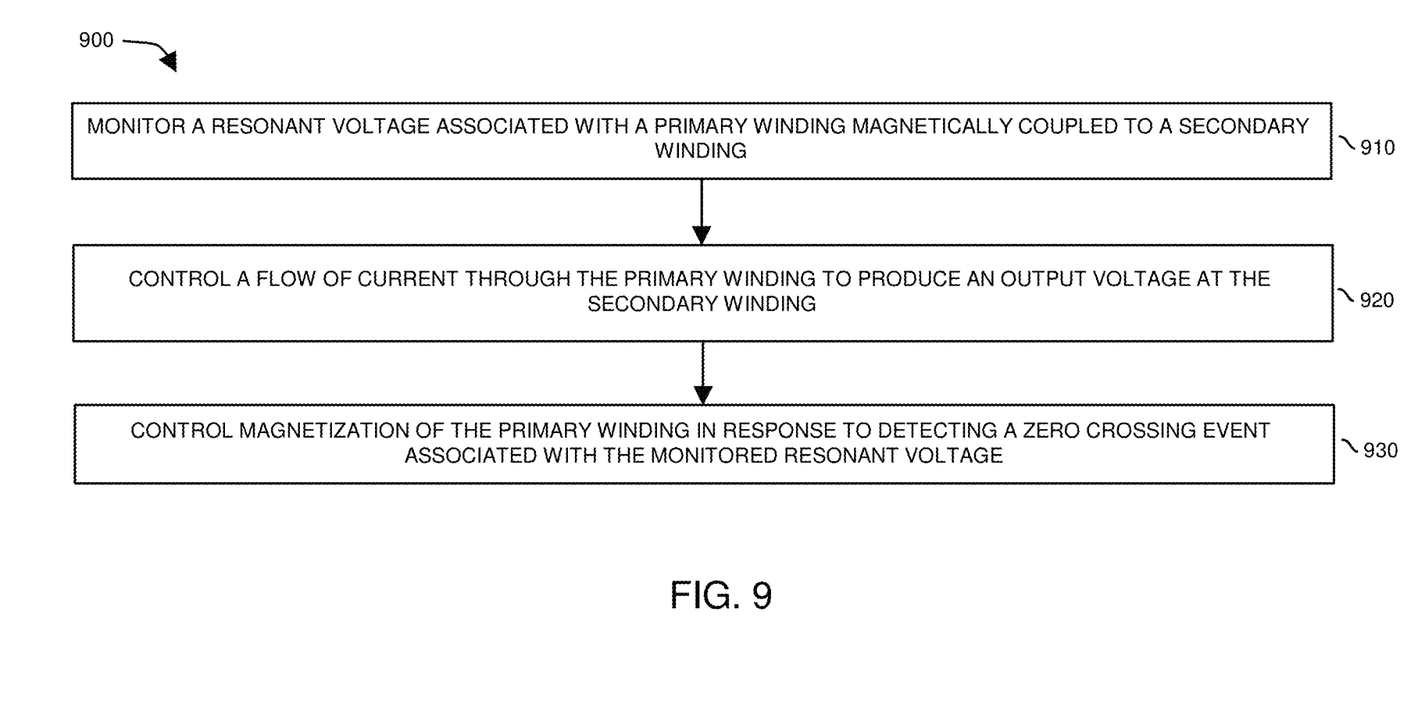
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the controller 140 monitors resonance of voltage 161 associated with a primary winding 121 magnetically coupled to a secondary winding 122.

In processing operation 920, via switch S0, the controller 140 controls a flow of current through the primary winding 121 to produce an output voltage 129 at the secondary winding 122.

In processing operation 930, the controller 140 controls magnetization of the primary winding 121 in response to detecting a zero crossing event associated with the monitored voltage 161.

Figure 10:
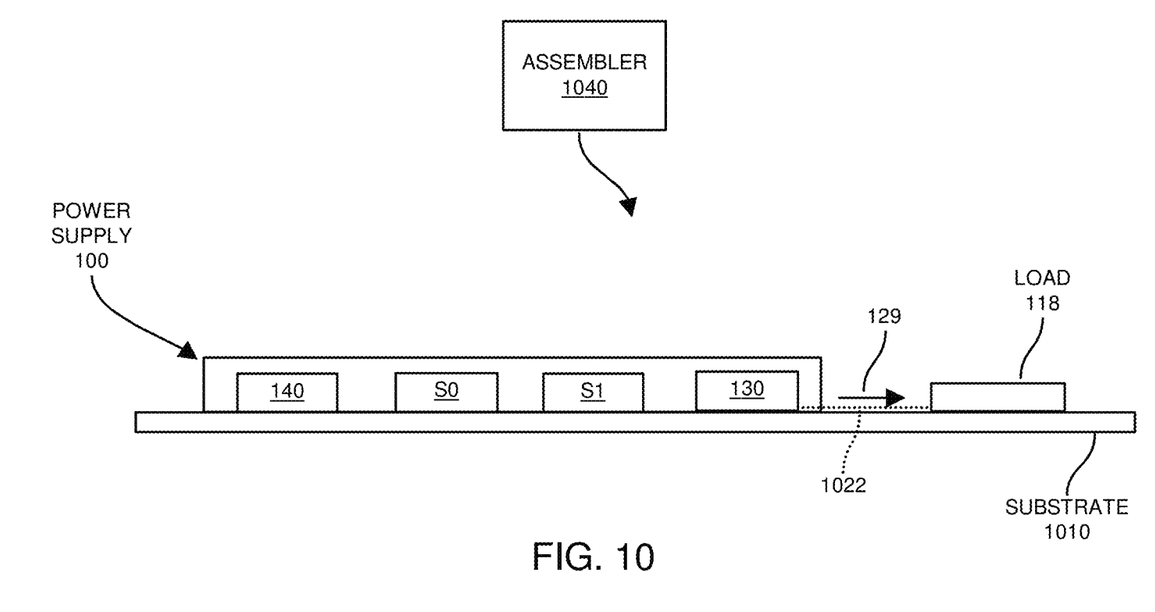
FIG. 10 is an example diagram illustrating fabrication of a circuit according to embodiments herein.

FIG. 10 is an example diagram illustrating assembly of a circuit board including a current monitor and controller according to embodiments herein.

In this example embodiment, assembler 1040 receives a substrate 1010 (such as a circuit board).

The assembler 1040 further affixes (couples) the components of power supply 100 (such as including controller 140, switch S0, switch S1, transformer 120, etc.) to the substrate 1010.

Via one or more circuit paths 1022 (such as one or more traces, electrical conductors, cables, wires, etc.), the assembler 1040 or other suitable entity couples the power supply 100 to the load 118. In one embodiment, the one or more circuit paths provides connectivity of the power supply 100 and corresponding transformer 120 to the load 118.

Note that components such as the transformer 120, controller 140, switch S0, switch S1, etc., can be affixed or coupled to the substrate 1010 in any suitable manner. For example, each of the one or more of the components in power supply 100 can be soldered to the substrate, inserted into one or more respective sockets on the substrate 1010, etc.

Note further that the substrate 1010 is optional. If desired, the components of power supply 100 and corresponding circuit paths can be disposed in cables or other suitable resource.

As previously discussed, via one or more circuit paths 1022 (such as one or more traces, cables, connectors, wires, conductors, electrically conductive paths, etc.), the assembler 1040 provides connectivity of the power supply 100 to the load 118. In one embodiment, the circuit paths 1022 convey the output voltage 129 and/or output current 128 from the power supply 100 to the load 118.

Accordingly, embodiments herein include a system comprising: a substrate 1010 (such as a circuit board, standalone board, mother board, standalone board destined to be coupled to a mother board, host, etc.); a power supply 100 including corresponding components as described herein; and a load 118. As previously discussed, the load 118 is powered based on conveyance of the output voltage 129 over one or more paths 1022.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
  a controller operative to:
    monitor a resonant voltage associated with a primary winding magnetically coupled to a secondary winding, the resonant voltage received from an auxiliary winding magnetically coupled to the primary winding;
    control a flow of current through the primary winding to produce an output voltage at the secondary winding; and
    control current through the auxiliary winding in response to a detected zero crossing event associated with the monitored resonant voltage, the control of the current through the auxiliary winding controlling magnetization of the primary winding.

2. The apparatus as in claim 1, wherein the resonant voltage occurs due to parasitic capacitance and inductance associated with the primary winding and a first switch in series with the primary winding, the first switch operative to control the flow of current through the primary winding.

3. The apparatus as in claim 1, wherein the controller is further operative to select which of multiple zero crossing events of the monitored resonant voltage to use as a trigger following a first detected zero crossing event to control magnetization of the primary winding, the trigger depending on a magnitude of a load powered by the output voltage.

4. The apparatus as in claim 1, wherein the controller is further operative to control the magnetization of the primary winding at a subsequent peak voltage of the monitored resonant voltage following the detected zero crossing event.

5. The apparatus as in claim 4, wherein the subsequent peak voltage is a next peak voltage of the monitored resonant voltage following the detected zero crossing event.

6. The apparatus as in claim 1, wherein the controller is further operative to magnetize the primary winding at a peak magnitude of the monitored resonant voltage following the zero crossing event.

7. The apparatus as in claim 1, wherein the controller is further operative to:
  activate a switch after a determined delay time with respect to detecting the zero crossing event, activation of the switch pre-magnetizing the primary winding.

8. The apparatus as in claim 7, wherein the determined delay time is substantially 75% of a resonance period of the monitored resonant voltage.

9. The apparatus as in claim 7, wherein the controller is operative to control a duration of activating the switch based on a magnitude of the monitored resonant voltage.

10. The apparatus as in claim 7, wherein the controller is operative to control a duration of activating the switch based on a magnitude of the monitored resonant voltage and a magnitude of an input voltage supplied to the primary winding.

11. A power supply comprising:
  a switch controlled by the controller as in claim 1, a state of the switch operative to control the flow of current through the primary winding; and
  a transformer including the primary winding and the secondary winding in claim 1.

12. The apparatus as in claim 1, wherein the controller is further operative to:
  activate a first switch after a determined delay time with respect to detecting the zero crossing event, the first switch disposed in series with the auxiliary winding, activation of the first switch controlling the current through the auxiliary winding and the magnetization of the primary winding.

13. The apparatus as in claim 12, wherein the controller is further operative to:
  control the flow of current through the primary winding via a second switch disposed in series with the primary winding.

14. The apparatus as in claim 12, wherein the determined delay time corresponds to a peak magnitude of the resonant voltage.

15. The apparatus as in claim 12, wherein the controller is further operative to select which of multiple zero crossing events of the monitored resonant voltage to use as a trigger following a first detected zero crossing event to control magnetization of the primary winding.

16. The apparatus as in claim 1, wherein the control of the current through the auxiliary winding pre-magnetizes the primary winding via storage of energy in the primary winding.

17. The apparatus as in claim 1, wherein the controller is further operative to:
  activate a first switch disposed in series with the auxiliary winding to pre-magnetize the primary winding via storage of energy in the primary winding; and
  subsequent to pre-magnetizing of the primary winding, and deactivation of the first switch, activate a second switch to control the flow of current through the primary winding and produce the output voltage, the second switch disposed in series with the primary winding.

18. The apparatus as in claim 17, wherein the controller is further operative to:
  transition the first switch from an OFF state to an ON state at a time in which a magnitude of the resonant voltage at is at a valley.

19. The apparatus as in claim 1, wherein the auxiliary winding is a first auxiliary winding; and wherein the control of current through the first auxiliary winding includes control of current through a second auxiliary winding, the second auxiliary winding magnetically coupled to both the first auxiliary winding and the primary winding.

20. An apparatus comprising:

a controller operative to:

monitor a resonant voltage associated with a primary winding magnetically coupled to a secondary winding;

control a flow of current through the primary winding to produce an output voltage at the secondary winding, the flow of current through the primary winding controlled via a first switch disposed in series with the primary winding;

control magnetization of the primary winding with respect to a detected zero crossing event associated with the monitored resonant voltage, the monitored resonant voltage generated by a first auxiliary winding magnetically coupled to the primary winding; and wherein the controller is further operative to control the flow of current through the primary winding at a valley magnitude of the monitored resonant voltage following the zero crossing event, the primary winding pre-magnetized via controlled flow of current through a second auxiliary winding magnetically coupled to the primary winding, the controlled flow of current through the second auxiliary winding occurring during deactivation of the first switch to an OPEN state.

21. An apparatus comprising:

a controller operative to:

monitor a resonant voltage associated with a primary winding magnetically coupled to a secondary winding;

control a flow of current through the primary winding to produce an output voltage at the secondary winding; and control magnetization of the primary winding with respect to a detected zero crossing event associated with the monitored resonant voltage;

wherein the controller is operative to execute a first mode of valley voltage switching of a first switch controlling the flow of current through the primary winding in response to a condition in which a magnitude of an input voltage supplied to the primary winding is less than a threshold value; and wherein the controller is operative to execute a second mode of peak voltage switching of a second switch coupled to an auxiliary winding magnetically coupled to the primary winding in response to a condition in which the magnitude of the input voltage supplied to the primary winding is greater than the threshold value.

22. A method comprising:

monitoring a resonant voltage associated with a primary winding magnetically coupled to a secondary winding, the resonant voltage received from an auxiliary winding magnetically coupled to the primary winding and the secondary winding;

controlling a flow of current through the primary winding to produce an output voltage at the secondary winding; and controlling a flow of current through the auxiliary winding in response to a detected zero crossing event associated with the monitored resonant voltage, the control of the flow of current through the auxiliary winding controlling magnetization of the primary winding.

23. The method as in claim 22, wherein the resonant voltage occurs due to parasitic capacitance and inductance associated with the primary winding and a first switch disposed in series with the primary winding, the first switch operative to control current through the primary winding.

24. The method as in claim 23, wherein controlling magnetization of the primary winding in response to detecting the zero crossing event associated with the monitored resonant voltage includes:

controlling activation of a second switch disposed in series with the auxiliary winding.

25. The method as in claim 22, wherein controlling magnetization of the primary winding includes:

selecting which of multiple zero crossing events of the monitored resonant voltage to use as a trigger to control switching of the flow of current through the primary winding.

26. The method as in claim 22, wherein controlling magnetization of the primary winding includes:

initiating pre-magnetization of the primary winding at a subsequent peak voltage of the monitored resonant voltage following the detected zero crossing event, the pre-magnetization including storage of energy in the primary winding via the flow of current through the auxiliary winding.

* * * * *